(12) United States Patent
Baumann et al.

(10) Patent No.: US 6,519,515 B1
(45) Date of Patent: Feb. 11, 2003

(54) METHOD FOR TESTING THE FUNCTIONING OF A DRVING DYNAMICS CONTROL SENSOR SYSTEM

(75) Inventors: Matthias Baumann, Herrenberg (DE); Ralph Klingel, Wimsheim (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/048,628
(22) PCT Filed: Jun. 21, 2000
(86) PCT No.: PCT/EP00/05726
§ 371 (c)(1), (2), (4) Date: Jun. 14, 2002
(87) PCT Pub. No.: WO01/10693
PCT Pub. Date: Feb. 15, 2001

(30) Foreign Application Priority Data

Aug. 4, 1999 (DE) .................................. 199 36 596

(51) Int. Cl.$^7$ .................................. G06F 7/00
(52) U.S. Cl. .................................. 701/34; 701/41
(58) Field of Search .................................. 701/34, 38, 41, 701/70; 180/197

(56) References Cited

U.S. PATENT DOCUMENTS 5,617,337 A   4/1997   Eidler et al.
6,122,577 A   9/2000   Mergenthaler et al.

FOREIGN PATENT DOCUMENTS

| DE | 4214642  | 11/1993 |
| DE | 19636443 | 3/1998  |
| DE | 19747144 | 6/1998  |
| DE | 19725058 | 12/1998 |

*Primary Examiner*—Richard M. Camby
(74) *Attorney, Agent, or Firm*—Crowell & Moring LLP

(57) ABSTRACT

The invention relates to a method for testing the functioning of a driving dynamics control sensor system of a vehicle, said sensor comprising a yaw rate sensor, a transverse acceleration sensor and/or a steering angle sensor. According to the invention, the measuring signal values supplied by the driving dynamics control sensor system in the momentary test starting state of the vehicle are established as the starting values at the beginning of a testing operation. The measuring signal values that are supplied continuously throughout a subsequent test drive, which includes driving around a bend at a predetermined longitudinal speed, are compared with said starting values during said test drive. An error by the sensor system is detected depending on the results of the comparison of the measuring signal values supplied during the test drive with the corresponding starting values. The invention also relates to the use of the inventive method for e.g. testing the functioning of the driving dynamics control sensor of an automobile before it is driven for the first time or following repairs.

20 Claims, 2 Drawing Sheets

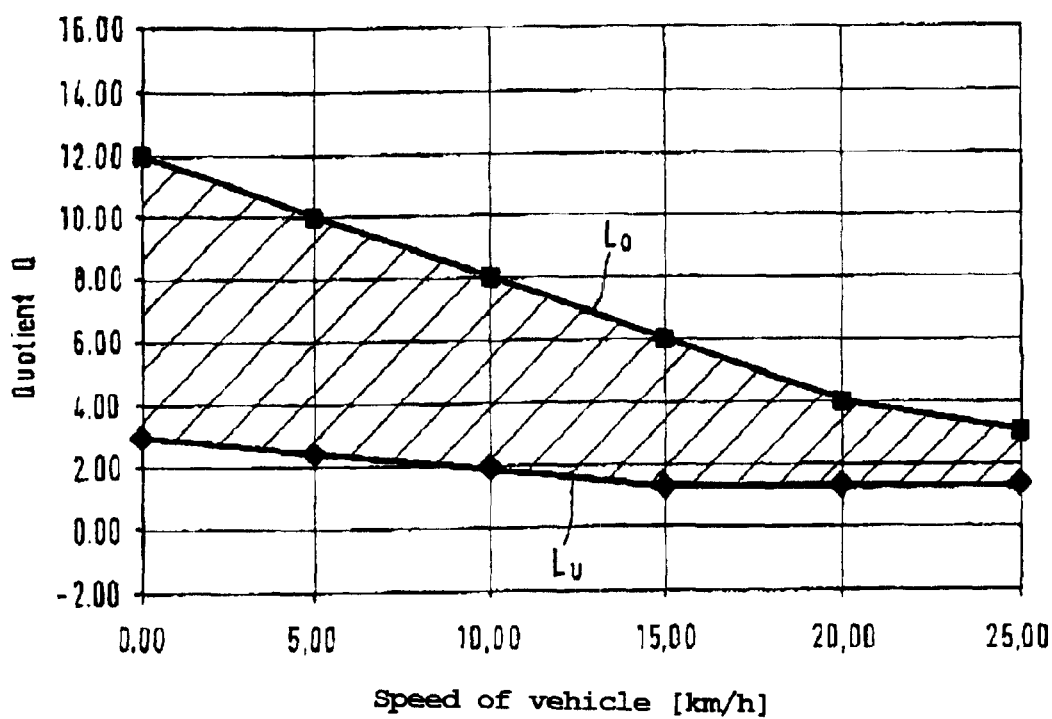

METHOD FOR TESTING THE FUNCTIONING OF A DRVING DYNAMICS CONTROL SENSOR SYSTEM

BACKGROUND AND SUMMARY OF THE INVENTION

The invention relates to a method for functionally testing a vehicle dynamics control sensor system of a vehicle, which comprises a yaw rate sensor, a transverse acceleration sensor and/or a steering angle sensor.

In modern motor vehicles, vehicle dynamics control systems are increasingly used to support the driver specifically in situations which are critical for vehicle dynamics, in particular by means of situation-dependent, wheel-specific braking intervention. A precondition for this is the detection of the current state of vehicle dynamics using a vehicle dynamics control sensor system, which contains one or two or all three of the abovementioned sensors. In many earlier vehicle dynamics control systems, the associated sensor system is composed, for example, of a yaw rate sensor and a steering angle sensor, while in modern vehicles all three abovementioned sensors are used. Vehicle dynamics control systems of this type are used, for example, by Daimler-Chrysler AG in its vehicles under the abbreviation ESP (Electronic Stability Program).

As in all vehicle components, the vehicle dynamics control sensor system is also subject to possible malfunctions, which may be due to a failure of the sensor or sensors or due to faulty installation of the sensor system. The following are examples of sources of faults: interchanging of yaw rate sensor and transverse acceleration sensor; cable twisting on the cabling of the yaw rate sensor and/or on the cabling of the transverse acceleration sensor; incorrect installation position of the yaw rate sensor and/or of the transverse acceleration sensor; emission of a constant, "stuck" signal of one of the sensors despite its electrical part being free of faults; and incorrect repair to the steering angle sensor or to the vehicle steering system.

It is therefore necessary to have a method with which the functional capability of the vehicle dynamics control sensor system can be checked for freedom from faults, in particular before the vehicle is first put into service and after repairs.

U.S. Pat. No. 5,617,337 describes a method and a device for functionally monitoring a sensor for sensing a measured value in a motor vehicle. When predefined operating states are present, a measured value is sensed and compared with a reference value. Faults are detected if a measured value which is made available by the sensor differs from a reference value by more than a tolerance value. A measured value, which has been registered at an earlier time at a corresponding operating state and has been stored, serves as reference value. The sensor is a sensor for registering the position of a control rod of a diesel injection pump. In the operating state under consideration, the control rod is, for example, in a stop limit position or in a start limit position.

In the German laid-open application DE 196 36 443 A1, a method for functionally testing a vehicle dynamics control sensor system of a vehicle is described which has a yaw rate sensor, a transverse acceleration sensor and a steering angle sensor. Comparison variables, defined in the same way, are determined for the individual sensors of the vehicle dynamics control sensor system as a function of the signals generated by them. In accordance with the exemplary embodiment described, for example, a yaw rate is determined as a comparison variable for the transverse acceleration sensor as a function of the transverse acceleration signal generated by it. The same applies to the steering angle sensor and to the wheel speed sensors. A reference variable is then determined from the comparison variables which are defined in the same way for the respective sensors. The exemplary embodiment here is also concerned with a yaw rate. Using inverse mathematical models, in each case a sensor reference variable is determined at least for some of the sensors as a function of the reference variable. The individual sensor is then checked as a function of this sensor reference variable, using plausibility interrogations.

Accordingly, the technical problem on which the invention is based is to make available a method of the type mentioned at the beginning with which the function of a vehicle dynamics control sensor system can be checked reliably and relatively easily.

The invention solves this problem by making available a method that, initially at the start of a test process, the measurement signal values of the vehicle dynamics control sensor system which are present at this moment are sensed as corresponding starting values. Then, during a subsequent test run of the vehicle, which takes place under predefinable test run conditions, the measurement signal values, which are continuously supplied by the vehicle dynamics control sensor system, are compared with the associated starting values. Here, the test run includes, in particular, travelling through a bend with a vehicle longitudinal speed which lies in a predefinable speed range. For such a driving situation, the measurement signals of the respective sensor or sensors lie within characteristic ranges under no fault conditions. By subsequently evaluating the results of comparing the measurement signal values, which are obtained during the test run, with the associated starting values, it is possible to detect whether the vehicle dynamics control sensor system is operating without faults. Only when the system is operating without faults, the comparison results lie within predefinable value ranges which can depend on the test run conditions. It becomes apparent that reliable functional testing of the vehicle dynamics control sensor system can be achieved by means of this procedure.

In another method according to the present invention, which is suitable for a vehicle dynamics control sensor system which comprises a yaw rate sensor, a transverse acceleration sensor and a steering angle sensor, compliance with a cornering condition for the test run is monitored by reference to the output signals of the three sensors. It is known that each of these three sensors is suitable for detecting cornering. According to the invention, it is therefore concluded that cornering is actually occurring if at least two of the three sensors indicate such a cornering situation.

In yet another method according to the present invention, the test run conditions are selected in terms of the longitudinal speed of a vehicle such that the longitudinal speed lies within a relatively low speed range. For this speed range, well-defined relationships are obtained between the individual sensor signals to facilitate the testing for the freedom of the sensors from faults. In this low speed range, for example, a test run normally always results in a higher measurement signal value for the yaw rate sensor than for the transverse acceleration sensor.

In a further method according to the present invention, the steering angle sensor, which can be specifically a steering wheel angle sensor, for example, is checked for freedom from faults by detecting whether the measured steering angle value registered by the sensor during the test run lies, on at least one occasion, above the associated steering angle starting value in absolute terms by more than a predefined minimum value. This is a suitable criterion for the functional capability of the steering angle sensor taking into account the fact that the vehicle travels through a bend during the test run and this is expressed in a corresponding change in the steering angle.

One development of the inventive method according to claim 5 relates specifically to functional checking of yaw rate and transverse acceleration sensors. Here, the ratio between the two differences between the current measurement signal value and the associated starting value is determined for the two sensors and it is subsequently tested whether said ratio lies within a predefinable set point range. If not, it is concluded that there is a malfunction in one of the two sensors, in which case the term "sensor malfunction" is to be understood here as not only a sensor failure but also, for example, incorrect cabling of the respective sensor. This procedure exploits the fact that in a fault-free situation under the given test run conditions there is a certain correlation between the measurement signals of these two sensors, which correlation is reflected in the fact that the aforesaid ratio then lies in the associated set point range.

A method which is developed according to claim 6 is suitable for functionally testing in particular the yaw rate sensor and/or the transverse acceleration sensor, and said method provides for the absolute value of the difference between the current measurement signal value and the associated starting value to be determined repeatedly for the respective sensor of the two sensors during the test run, and for the presence of a malfunction in the respective sensor to be concluded if this absolute value of the difference lies too rarely above a minimum value over the entire duration of the test run. This procedure exploits the fact that when there are no faults, these sensors supply, during the cornering which follows the vehicle starting state, a measurement signal value which is sufficiently different from the starting value, which possibly changes continuously and which neither remains constant with respect to the starting value over a relatively long time period nor merely changes suddenly during the test run.

One advantageous embodiment of the invention is illustrated in the drawings and will be described below. In said drawings:

Other objects, advantages and novel features of the present invention will become apparent from the following detailed description of the invention when considered in conjunction with the accompanying drawings.

BRIEF DESCRIPTION OF THE DRAWINGS

FIG. 2 shows a graphic representation of a speed-dependent ratio set point range for measurement signal difference values of a yaw rate sensor and of a transverse acceleration sensor.

DETAILED DESCRIPTION OF THE DRAWINGS

Figure 1:
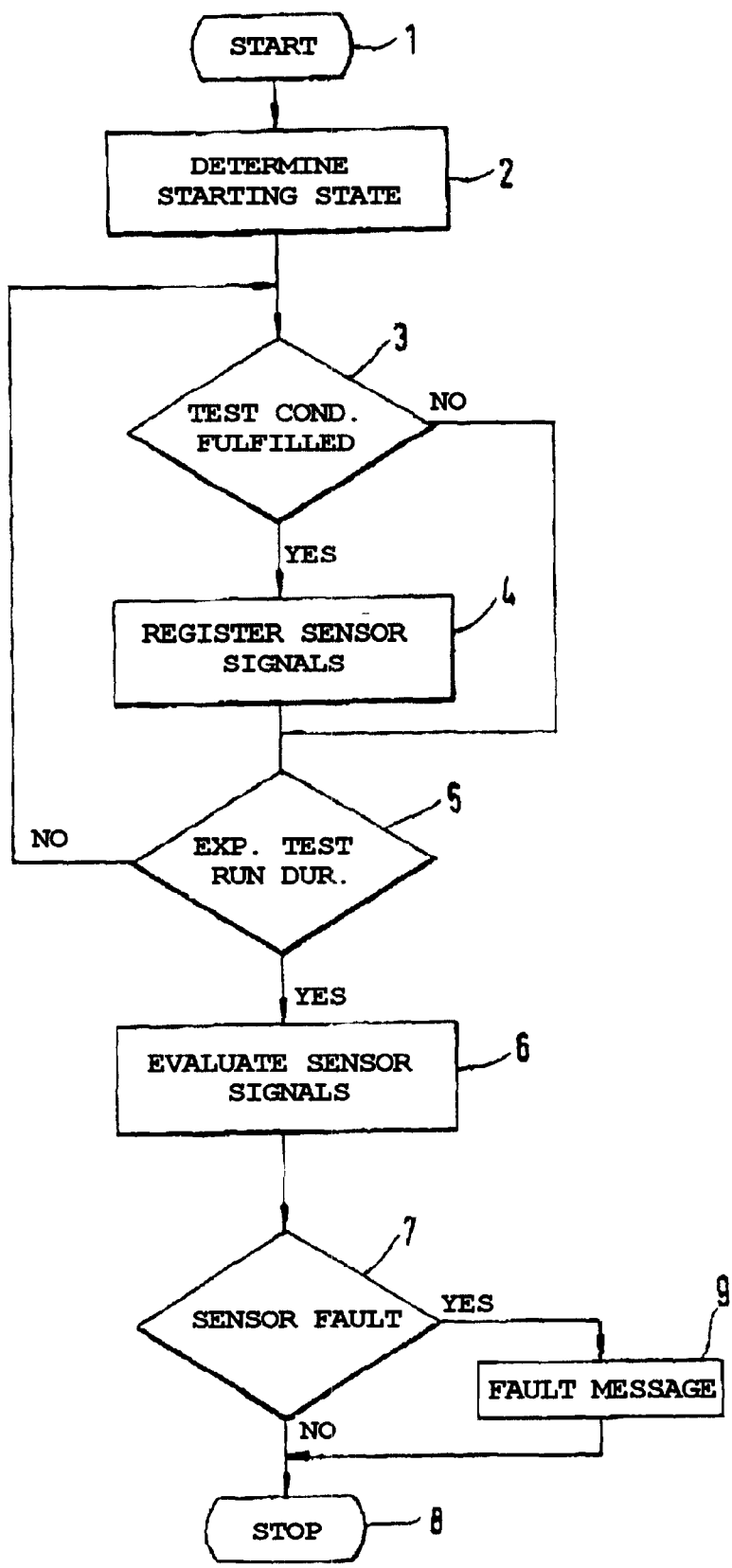
FIG. 1 shows a flowchart of a method for functionally testing a vehicle dynamics control sensor system.

The method whose sequence is explained below with reference to FIG. 1 is suitable for functionally testing a vehicle dynamics control sensor system which comprises a yaw rate sensor, a transverse acceleration sensor and a steering angle sensor. By means of simple modifications which are readily apparent to the person skilled in the art from the following explanations, it is possible also to apply the method in an analogous fashion for functionally testing a vehicle dynamics control sensor system which has just one or two of these three sensors, in each case only the method steps which relate to the sensor or sensors present being then carried out.

The method sequence shown in FIG. 1 begins with a starting step 1 with which a functional testing process is requested. This request can be activated automatically, for example during the manufacture of the vehicle, by a test device in an event-dependent fashion when the vehicle leaves a roller test bench at the end of the line. Otherwise, the request can be activated manually by means of a diagnostic channel during maintenance on the vehicle by maintenance personnel, for example in a workshop.

The starting state, i.e. the state of the vehicle at the start of a test run, is determined in response to the starting request (step 2). This comprises the determination of whether predetermined test run conditions apply, and if they do the storage of the measurement signal values supplied by the sensors of the vehicle dynamics control sensor system at this time as starting values. Thus, due to the tolerances of the sensors themselves and as a result of installation tolerances, for example on the transverse acceleration sensor, zero point faults may occur which have to be eliminated for the functional testing. In an active test procedure, the system assumes that the vehicle is standing on a flat surface and is not moving backwards. The current measurement signal values of the yaw rate sensor and of the transverse acceleration sensor are then stored as zero point starting values in response to the test starting request. For the steering angle sensor, which can be in particular a steering wheel angle sensor, the zero point can be determined only during driving, for which reason the only test carried out with respect to it is whether its generated steering angle measurement signal changes. For this purpose, the currently supplied steering angle measured value is stored as a starting value when the test run request is activated.

It is specified, as a speed-related test run condition, that during the test run the vehicle must be in a predefined longitudinal speed band between a minimum value $v_{min}$ and a maximum value $v_{max}$. The minimum value $v_{min}$ is typically defined as a value between 1 km/h and 10 km/h, for example as 5 km/h, while the maximum value $v_{max}$ is typically defined as a value between 15 km/h and 40 km/h, for example as 25 km/h.

The presence of cornering is used as a further test run condition. The detection of cornering can be carried out system-internally by reference to the measurement signal values of the three sensors. By reference to the measurement signal values, in which case each of these sensors can, as is known, decide whether a specific required degree of cornering occurs, specifically if the measurement signal values lie in a corresponding value range which is indicative of cornering and which can be dependent on the driving situation. In the example of the steering angle sensor, it is possible, for example, to conclude that cornering is occurring if said sensor indicates a correspondingly large steering angle value which is, for example, 90° or more in absolute terms.

The test run then takes place with continuous checking of the test run conditions described above. If in the corresponding test run condition interrogation step 3 it is determined that the predefined test run conditions apply, the current measurement signals of the three sensors are registered cyclically. This includes the measure of cyclically comparing the difference between the current measurement signal value and the buffered signal values, in particular the starting values, for the yaw rate sensor and the transverse acceleration sensor. If the absolute value of the difference is greater in this comparison than a respectively predefinable minimum value of, for example, 0.54°/s for the yaw rate sensor or 0.0122 g for the transverse acceleration sensor, a counter which is assigned to the respective sensor is incremented and the current measurement signal value is buffered. The counter reading is then evaluated after the termination of the test run. If the respective sensor signal is constant during the test run or if it only changes suddenly, the associated counter reading does not change, or only changes to a very small degree. On the other hand, the counter reading increments continuously if the respective measurement signal value changes continuously. As a result, at the end of the test run it is possible to conclude the presence of a yaw rate signal or a transverse acceleration signal which has faultily remained essentially constant if the counter reading which is obtained lies below a predefinable minimum value.

If the test run conditions do not apply for a certain time period which is not excessively long, the registering of the sensor signals is bypassed for this time period. In this case, in the next method step it is interrogated whether a predefinable test run duration of, for example, 20 s has expired (step 5). If it has not, the next cycle with checking of the test run conditions and subsequent sensor signal measured value registration is carried out. If the duration of the test run has expired, the test results which are obtained during the test run, i.e. the supplied sensor signal measured values, are evaluated (step 6).

Here, the difference between the currently measured steering angle and the associated starting value for the steering angle sensor is formed during the test run and if this difference exceeds a specific minimum value of, for example, 30° once during the test run, the steering angle sensor signal is declared valid, i.e. it is concluded that the steering angle sensor is free of faults.

In order to functionally test the yaw rate sensor and the transverse acceleration sensor, a specific evaluation variable in the form of a ratio or a quotient Q is used to detect whether both sensors are operating without faults or whether one of the sensors is faulty, and if so which. For this purpose, the quotient Q is defined by the following relationship:

$$Q=(GR-GR_s)/QB-QB_s),$$

GR being the current measurement signal value and $GW_s$ being the starting value of the yaw rate sensor, and QB designating the current measurement signal value and $QB_s$ designating the starting value of the transverse acceleration sensor. For the evaluation, two special cases will firstly be considered separately. If, on the one hand, the absolute value of the difference between the measurement signals of the yaw rate sensor occurring in the counter of the quotient Q does not reach a predefined minimum value, it is randomly reduced to a predefinable, very small value, and the sign of the quotient Q is derived in this case from the difference between the measurement signals of the transverse acceleration sensor which is present in the denominator of the quotient Q. Analogously, this absolute value of the difference is in turn randomly reduced to a very low value in the case in which the difference between the measurement signals of the transverse acceleration sensor present in the denominator of the quotient Q does not reach in absolute terms a certain minimum value, and the sign of the quotient Q is derived from the difference between the measurement signals of the yaw rate sensor which is present in the counter of the quotient Q. This prevents an incorrect or fluctuating sign being obtained for the quotient Q as a result of zero point fluctuations of one of the two differences between the measurement signals.

If the yaw rate sensor and the transverse acceleration sensor are operating without faults, given the predefined test run conditions which represent slow travel through a tight bend, the quotient Q defined above lies within a value range which is dependent on the longitudinal speed of the vehicle. An example of this range is illustrated by hatching in FIG. 2. This set point range of the quotient Q is limited downwardly by a lower limiting line $L_u$ and upwardly by an upward limiting line $L_o$. Since in the speed band of low longitudinal speeds of the vehicle the measurement signal value of the yaw rate sensor is always higher than that of the transverse acceleration sensor, the lower limiting line $L_u$ lies above the value one, approaching it asymptotically from above for higher longitudinal speeds of the vehicle. The upper limiting line $L_o$ for relatively high longitudinal speeds of the vehicle also decreases, but starts from a higher value and decreases more steeply than the lower limiting line $L_u$, with the result that the set point range for the quotient Q is narrower for relatively high longitudinal speeds of the vehicle. Depending on the value determined for the quotient Q, the following cases can be distinguished taking into account the conditions illustrated in FIG. 2.

If the quotient Q lies in the set point range, it is concluded that both sensors are free of faults. If the quotient Q assumes a very small positive value significantly below the lower limiting line $L_u$ of, for example, between 0 and 0.1, it is concluded that there is a faulty yaw rate sensor with a constant, "stuck" output signal. Correspondingly, the presence of a "stuck" output signal of the transverse acceleration sensor which faultily remains constant is concluded if the quotient Q lies above the upper limiting line $L_o$. If the quotient Q lies only a relatively small amount below the lower limiting line $L_u$, for example at a value between 0.1 and 1.0 in the case of a lower limiting line $L_u$ which is standardized to the value one, it is concluded that the yaw rate sensor and the transverse acceleration sensor have been mounted in interchanged positions. If the quotient Q assumes a negative value, it is concluded that the installation position of the yaw rate sensor or of the transverse acceleration sensor is incorrect.

In summary, by means of the evaluation measures described above it is then determined whether a sensor fault has been detected in the vehicle dynamics control sensor system by means of the functional testing (step 7). If not, the functional testing is concluded successfully (step 8), i.e. the vehicle dynamics control sensor system is assessed as having been installed and as functioning without faults. On the other hand, if one or more sensor faults have been determined, a corresponding fault message or a fault entry in a diagnostics protocol (step 9) is made, in which case, as described above, it is possible to determine, and consequently report, not only the fact that a sensor fault has occurred, but usually also the type of fault.

Thus, in the case of a faulty yaw rate sensor, it is possible to request checking of this sensor and/or of the cabling of the vehicle. Correspondingly, when a fault is detected in the transverse acceleration sensor, it is possible to request checking of this sensor and/or of the cabling of the vehicle. When it is detected that the yaw rate sensor and transverse acceleration sensor have been interchanged, this can be appropriately reported and a correction can thus be brought about. If an essentially constant measurement signal has been detected for the yaw rate sensor and/or the transverse acceleration sensor during the test run by means of the evaluation described above for this purpose, this is in turn reported as a corresponding fault in conjunction with a request to check the respective sensor and/or the cabling of the vehicle.

If a continuously negative quotient Q has been determined, the signs of the yaw rate sensor signal and of the transverse acceleration sensor signal are compared with that of the steering angle sensor. If the sign of the transverse acceleration signal corresponds to that of the steering angle signal, a request is made, as a fault message, to check the installation position of the yaw rate sensor, whereas if the sign of the yaw rate sensor signal corresponds to that of the steering angle sensor signal, a request to check the installation position of the transverse acceleration sensor is made. If the quotient Q lies continuously in the acceptable set point range, but the steering angle measurement signal has been detected as invalid, the steering angle sensor is reported as being faulty after the selected chronological limitation of the test run has expired.

With respect to resetting the test run request, it is possible for a reset to be brought about when a test run is passed successfully or by a reset being activated via the diagnostics channel when a test run is not passed successfully or is aborted. In the latter case, all the diagnostics entries relating to the test run are deleted and after the diagnostics mode has been exited, the vehicle dynamics control becomes fully active again. The request for a test run is preferably not deleted by activating the ignition.

The above description of an advantageous exemplary embodiment shows that a vehicle dynamics control sensor system can be very reliably checked for a multiplicity of different possible function faults by the method according to the invention with relatively little expenditure within the framework of a brief test run. Of course, depending on the situation, modifications of the described example are possible within the framework of the invention defined by the patent claims, in particular as far as the respective specific choice of the numerical values for the various threshold values used is concerned.

What is claimed is:

1. Method for functionally testing a vehicle dynamics control sensor system of a vehicle, which comprises a yaw rate sensor, a transverse acceleration sensor and/or a steering angle sensor, the method comprising:
   at the start of a test process the measurement signal values supplied by the vehicle dynamics control sensor system during the instantaneous test-starting state of the vehicle are sensed as starting values,
   during a subsequent test run of the vehicle under predefinable test run conditions, which comprise travelling through a bend with a vehicle longitudinal speed which lies in a predefinable speed range, the measurement signal values supplied by the vehicle dynamics control sensor system are sensed and compared with the associated starting values, and
   a fault in the vehicle dynamics control sensor system is concluded depending on the results of the comparison between the measurement signal values supplied during the test run and the associated starting values.

2. Method according to claim 1, wherein the presence of the cornering test run condition is recognized on the basis of the output signals from the three sensors, the presence of cornering being concluded if the measurement signal values of at least two of the three sensors lie in a respectively associated cornering value range.

3. Method according to claim 1, wherein the test-run speed range extends from a minimum value, lying between 1 km/h and 10 km/h, to a maximum value lying between 15 km/h and 40 km/h.

4. Method according to claim 1, wherein the steering angle sensor is determined to be free from faults if the absolute value of the difference between its measurement signal values supplied during the test run, on the one hand, and the associated starting value, on the other, exceeds a predefinable minimum value at least once.

5. Method according to claim 1,
   wherein the ratio of the difference between the currently supplied measurement signal value and the associated starting value for the one sensor to the difference between the currently supplied measurement signal value and the associated starting value for the other sensor is determined, and
   it is concluded that there is a fault in at least one of the two sensors if the ratio which is determined lies outside a predefinable set point range.

6. Method according to claim 1,
   wherein the absolute value of the difference between the current measurement signal value and the associated starting value is repeatedly determined for one and/or the other of the two sensors during the test run and is compared with a predefinable minimum value, and
   it is concluded that there is a fault in the respective sensor if the number of times the minimum value is exceeded by the absolute value of the difference over the test run is smaller than a predefinable minimum number.

7. Method according to claim 2, wherein the test-run speed range extends from a minimum value, lying between 1 km/h and 10 km/h, to a maximum value lying between 15 km/h and 40 km/h.

8. Method according to claim 2, wherein the steering angle sensor is determined to be free from faults if the absolute value of the difference between its measurement signal values supplied during the test run, on the one hand, and the associated starting value, on the other, exceeds a predefinable minimum value at least once.

9. Method according to claim 2,
   wherein the ratio of the difference between the currently supplied measurement signal value and the associated starting value for the one sensor to the difference between the currently supplied measurement signal value and the associated starting value for the other sensor is determined, and
   it is concluded that there is a fault in at least one of the two sensors if the ratio which is determined lies outside a predefinable set point range.

10. Method according to claim 2,
    wherein the absolute value of the difference between the current measurement signal value and the associated starting value is repeatedly determined for one and/or the other of the two sensors during the test run and is compared with a predefinable minimum value, and
    it is concluded that there is a fault in the respective sensor if the number of times the minimum value is exceeded by the absolute value of the difference over the test run is smaller than a predefinable minimum number.

11. A method for functionally testing a vehicle dynamics control sensor system including at least one of a yaw rate sensor, a transverse acceleration sensor and a steering angle sensor, the method comprising:
    sensing and storing, as starting values, measurement signal values supplied by the vehicle dynamics control sensor system at an instantaneous test-starting state of a vehicle;

sensing measurement signal values supplied by the vehicle dynamics control sensor system during a subsequent test run of the vehicle under a predefinable test run condition; and comparing the measurement signal values obtained in the subsequent test run with the corresponding values obtained at the instantaneous test-starting state of the vehicle;

determining a fault in the vehicle dynamics control sensor system on the basis of the results of the comparison between the measurement signal values obtained during the test run and the corresponding values obtained at the instantaneous test-starting state of the vehicle.

12. The method according to claim 11, wherein the predefinable test run condition comprises travelling through a bend with a vehicle longitudinal speed in a predefinable speed range.

13. The method according to claim 12 further comprising recognizing the predefinable test run condition on the basis of the output signals from the three sensors.

14. The method according to claim 13, wherein recognizing the predefinable test run condition includes considering that the predefinable test run condition are met when measurement signal values of at least two of the three sensors are each in a corresponding value range.

15. The method according to claim 14, wherein the predefinable speed range is defined by a minimum speed and a maximum speed, wherein the minimum speed is in the range of 1 km/h to 10 km/h, and the maximum speed is in the range of 15 km/h to 40 km/h.

16. The method according to claim 15, wherein determining a fault in the vehicle dynamics control sensor system includes determining the steering angle sensor as to be free from faults if the absolute value of the difference between the measurement signal value obtained during the test run and the corresponding value obtained at the instantaneous test-starting state of the vehicle exceeds a predefinable minimum value at least once.

17. The method according to claim 16 further comprising determining the ratio of the difference between the currently supplied measurement signal value and the associated starting value for one of the sensors to the difference between the currently supplied measurement signal value and the associated starting value for another of the sensors, and determining that there is a fault in at least one of the two sensors if the ratio lies outside a predefinable range.

18. The method according to claim 17 further comprising determining repeatedly the absolute value of the difference between the currently supplied measurement signal value and the associated starting value for at least one of the yaw rate sensor and transverse acceleration sensor during the test run and comparing it with a predefinable minimum value, and determining that there is a fault in the sensor if the number of times the minimum value is exceeded by the absolute value over the test run is smaller than a predefinable minimum number.

19. The method according to claim 11 further comprising determining the ratio of the difference between the currently supplied measurement signal value and the associated starting value for one of the sensors to the difference between the currently supplied measurement signal value and the associated starting value for another of the sensors, and determining that there is a fault in at least one of the two sensors if the ratio lies outside a predefinable range.

20. The method according to claim 11 further comprising determining repeatedly the absolute value of the difference between the currently supplied measurement signal value and the associated starting value for at least one of the yaw rate sensor and transverse acceleration sensor during the test run and comparing it with a predefinable minimum value, and determining that there is a fault in the sensor if the number of times the minimum value is exceeded by the absolute value over the test run is smaller than a predefinable minimum number.

* * * * *